(12) United States Patent
Lee et al.

(10) Patent No.: US 10,546,209 B2
(45) Date of Patent: Jan. 28, 2020

(54) MACHINE LEARNING METHOD AND APPARATUS

(71) Applicant: ELECTRONICS AND TELECOMMUNICATIONS RESEARCH INSTITUTE, Daejeon (KR)

(72) Inventors: Seung Jae Lee, Daejeon (KR); Hyung Kwan Son, Daejeon (KR); Keun Dong Lee, Daejeon (KR); Jong Gook Ko, Daejeon (KR); Weon Geun Oh, Daejeon (KR); Da Un Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 181 days.

(21) Appl. No.: 15/835,662

(22) Filed: Dec. 8, 2017

(65) Prior Publication Data

US 2018/0189596 A1 Jul. 5, 2018

(30) Foreign Application Priority Data

Jan. 3, 2017 (KR) .......................... 10-2017-0000944

(51) Int. Cl.
*G06K 9/46* (2006.01)
*G06K 9/62* (2006.01)
(Continued)

(52) U.S. Cl.
CPC ......... *G06K 9/4642* (2013.01); *G06K 9/3233* (2013.01); *G06K 9/6267* (2013.01);
(Continued)

(58) Field of Classification Search
CPC .... G06K 9/4642; G06K 9/6267; G06N 20/00; G06T 2210/12
See application file for complete search history.

(56) References Cited

U.S. PATENT DOCUMENTS 5,825,919 A * 10/1998 Bloomberg ........ G06K 9/00463
382/177
6,574,354 B2 6/2003 Abdel-Mottaleb et al.
(Continued)

FOREIGN PATENT DOCUMENTS

KR 10-2015-0108577 A 9/2015
KR 10-2015-0136225 A 12/2015

OTHER PUBLICATIONS

Cheng, Gong "Learning Rotation-Invariant Convolution Neural Networks for Object Detection in VHR Optical Sensing Images" IEEE Transactions on Geoscience and Remote Sensing vol. 54, No. 12. (Year: 2016).*

(Continued)

*Primary Examiner* — Kim Y Vu
*Assistant Examiner* — Molly Delaney
(74) *Attorney, Agent, or Firm* — LRK Patent Law Firm

(57) ABSTRACT

A machine learning method for learning how to form bounding boxes, performed by a machine learning apparatus, includes extracting learning images including a target object among a plurality of learning images included in a learning database, generating additional learning images in which the target object is rotated from the learning images including the target object, and updating the learning database using the additional learning images.

17 Claims, 10 Drawing Sheets

(51) Int. Cl.
*G06N 20/00* (2019.01)
*G06K 9/32* (2006.01)

(52) U.S. Cl.
CPC .......... *G06K 9/6271* (2013.01); *G06N 20/00* (2019.01); *G06T 2210/12* (2013.01)

(56) References Cited

U.S. PATENT DOCUMENTS

| | | |
|---|---|---|
| 7,873,189 B2 | 1/2011 | Jee et al. |
| 8,121,364 B2 | 2/2012 | Mahesh et al. |
| 8,548,201 B2 | 10/2013 | Yoon et al. |
| 8,566,707 B1 | 10/2013 | Shagam et al. |
| 9,430,704 B2 | 8/2016 | Abdollahian |
| 10,304,191 B1* | 5/2019 | Mousavian ............... G06T 7/11 |
| 2010/0142787 A1* | 6/2010 | Zheng .................. G06K 9/3241 |
| | | 382/131 |
| 2011/0254950 A1* | 10/2011 | Bibby ....................... G06T 7/11 |
| | | 348/135 |
| 2013/0279800 A1* | 10/2013 | Ranganathan ....... G06K 9/4676 |
| | | 382/159 |
| 2018/0121762 A1* | 5/2018 | Han .................... G06K 9/4604 |

OTHER PUBLICATIONS

Seungjae Lee et al., "ImageNet Classification and Localization Task Analysis and Its Improvement", The Institute of Electronics and Information Engineers, Nov. 2016.

Shaoqing Ren et al. "Faster R-CNN Towards Real-Time Object Detection with Region Proposal Networks", Jan. 2016.

\* cited by examiner

MACHINE LEARNING METHOD AND APPARATUS

CROSS-REFERENCE TO RELATED APPLICATION

This application claims priority to Korean Patent Application No. 10-2017-0000944, filed Jan. 3, 2017 in the Korean Intellectual Property Office (KIPO), the entire content of which is hereby incorporated by reference.

BACKGROUND

1. Technical Field

The present disclosure relates to an apparatus and a method for machine learning, and more specifically, to a machine learning apparatus and a machine learning method for learning how to form bounding boxes of an object in an image.

2. Description of Related Art

With the advancement of unmanned technologies, techniques for automatically recognizing objects in images and classifying the recognized objects have been developed. In recent years, there have been many performance enhancements to image analysis techniques based on graphics processing unit (GPU) based high-speed operations, a lot of data, and deep learning.

In the image analysis techniques, an area (i.e., a bounding box) containing an object is specified in an image, and the object is classified. In a supervised learning based model, an image analysis model can be learned by using a learning database containing a large number of learning images. In the case of the supervised learning, the richness of the database used for learning greatly affects the accuracy of the image analysis model.

Therefore, various learning images are required depending on the type and position of the object. Currently, there are a lot of learning images for object identification, but images expressing positional information of objects included therein are relatively small. Since the positional information of objects should be manually input by a human for each image in order to generate the learning data in which the positional information of objects are expressed, it is difficult to secure sufficient learning data for deep learning.

SUMMARY

Accordingly, embodiments of the present disclosure provide a machine learning method and a machine learning apparatus for learning how to form bounding boxes of a target object in an image. In accordance with the embodiments of the present disclosure, additional learning images for machine learning may be generated, and a learning manner may be set differently according to an image type of the target object, such that a bounding box formation model having high accuracy can be generated.

In order to achieve the objective of the present disclosure, a machine learning method for learning how to form bounding boxes, which is performed by a machine learning apparatus, may comprise extracting learning images including a target object among a plurality of learning images included in a learning database; generating additional learning images in which the target object is rotated from the learning images including the target object; and updating the learning database using the additional learning images.

The method may further comprise obtaining information on a distribution of aspect ratios of bounding boxes of the target object in the learning images including the target object. Wherein the aspect ratios may mean ratios of width to height.

In the generating additional learning images, a rotation angle of the target object included in each of the additional learning images may be determined based on the distribution of aspect ratios of bounding boxes of the target object.

In the generating additional learning images, the additional learning images may be generated so that a distribution of aspect ratios of bounding boxes of the target object included in the additional learning images follows the distribution of aspect ratios of bounding boxes of the target object in the learning images including the target object.

In the updating, a bounding box of the target object included in each of the additional learning images may be reformed, and information on the reformed bounding box may be added to the learning database as being labeled to each of the additional learning images.

The method may further comprise generating a bounding box formation model using the updated learning database.

In order to achieve the objective of the present disclosure, a machine learning method for learning how to form bounding boxes, which is performed by a machine learning apparatus, may comprise extracting learning images including a target object among a plurality of learning images included in a learning database; determining an image type of the target object; determining learning parameters for the learning images including the target object based on the image type of the target object; and generating a bounding box formation model based on the learning database and the learning parameters.

In the determining an image type of the target object, information on specifications of bounding boxes of the target object in the learning images including the target object may be obtained, and the image type of the target object may be determined based on the information on specifications of bounding boxes.

In the determining an image type of the target object, the image type of the target object may be determined as one of a horizontal type, a vertical type, and a normal type based on aspect ratios of the bounding boxes of the target object.

The image type of the target object may be determined as the horizontal type when both of Equations 1 and 2 are satisfied, determined as the vertical type when both of Equations 1 and 2 are not satisfied, or determined as the normal type when only one of Equations 1 and 2 is satisfied. Here, Equation 1 is 'Aspect_ratio_mean>Th1', Equation 2 is 'Aspect_ratio_max/Aspect_ratio_min>Th2', Aspect_ratio_mean denotes an average value of aspect ratios of the bounding boxes of the target object, Aspect_ratio_max denotes a maximum value among the aspect ratios of the bounding boxes of the target object, Aspect_ratio_min denotes a minimum value among the aspect ratios of the bounding boxes of the target object, Th1 denotes a first reference value, and Th2 denotes a second reference value.

In order to achieve the objective of the present disclosure, a machine learning apparatus for learning how to form bounding boxes may comprise a processor and a memory storing at least one instruction executed by the processor. Also, the at least one instruction may be configured to extract learning images including a target object among a plurality of learning images included in a learning database; generate additional learning images in which the target object is rotated from the learning images including the target object; and update the learning database using the additional learning images.

The at least one instruction may be further configured to obtain information on a distribution of aspect ratios of bounding boxes of the target object in the learning images including the target object.

The at least one instruction may be further configured to determine a rotation angle of the target object included in each of the additional learning images based on the distribution of aspect ratios of bounding boxes of the target object.

The at least one instruction may be further configured to generate the additional learning images so that a distribution of aspect ratios of bounding boxes of the target object included in the additional learning images follows the distribution of aspect ratios of bounding boxes of the target object in the learning images including the target object.

The at least one instruction may be further configured to reform a bounding box of the target object included in each of the additional learning images, and add information on the reformed bounding box to the learning database as being labeled to each of the additional learning images.

The at least one instruction may be further configured to generate a bounding box formation model using the updated learning database.

The at least one instruction may be further configured to determine an image type of the target object, determine learning parameters for the learning images including the target object based on the image type of the target object, and generate a bounding box formation model based on the learning database and the learning parameters.

The at least one instruction may be further configured to obtain information on specifications of bounding boxes of the target object in the learning images including the target object, and determine the image type of the target object based on the information on specifications of bounding boxes.

The at least one instruction may be further configured to determine the image type of the target object as one of a horizontal type, a vertical type, and a normal type based on aspect ratios of the bounding boxes of the target object.

The at least one instruction may be further configured to determine the image type of the target object as the horizontal type when both of Equations 1 and 2 are satisfied, determine the image type of the target object as the vertical type when both of Equations 1 and 2 are not satisfied, or determine the image type of the target object as the normal type when only one of Equations 1 and 2 is satisfied. Here, Equation 1 is 'Aspect_ratio_mean>Th1', Equation 2 is 'Aspect_ratio_max/Aspet_ratio_min>Th2', Aspect_ratio_mean denotes an average value of aspect ratios of the bounding boxes of the target object, Aspect_ratio_max denotes a maximum value among the aspect ratios of the bounding boxes of the target object, Aspect_ratio_min denotes a minimum value among the aspect ratios of the bounding boxes of the target object, Th1 denotes a first reference value, and Th2 denotes a second reference value.

According to the embodiments, the quality of the machine learning can be improved by adding additional learning images in which a target object is rotated and information on bounding boxes of the target object in the additional learning images to a learning database. Further, by setting learning parameters for each of learning images containing the target object differently according to the image type of the target object, accuracy of a bounding box formation model generated by the machine learning can be enhanced.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
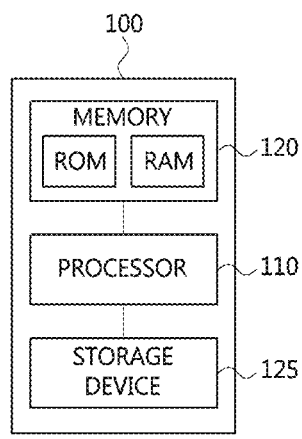
FIG. 1 is a block diagram illustrating a machine learning apparatus according to an embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate a thorough understanding of the present disclosure, the same reference numerals are used for the same constituent elements in the drawings and redundant explanations for the same constituent elements are omitted.

In the following description, a learning database may refer to learning materials used for machine learning in deep learning. The learning database may include a plurality of learning images and labeling information for each of the learning images. The labeling information of the learning image may include identification information of an object included in the learning image and positional information of the object. The identification information of the object may include information about what the object is. Also, the positional information of the object may include information on a bounding box indicating the position of the object. The labeling information may be utilized as feedback information in the deep learning.

FIG. 1 is a block diagram illustrating a machine learning apparatus 100 according to an embodiment of the present disclosure.

Referring to FIG. 1, a machine learning apparatus 100 according to an embodiment may comprise at least one processor 110, a memory 120, a storage device 125, and the like.

The processor 110 may execute at least one instruction stored in the memory 120 and/or the storage device 125. The processor 110 may refer to a central processing unit (CPU), a graphics processing unit (GPU), or a dedicated processor through which methods of the present disclosure are performed. The memory 120 and the storage device 125 may be composed of volatile storage media and/or non-volatile storage media. For example, the memory 120 may be comprised of read only memory (ROM) and/or random access memory (RAM).

The learning database for machine learning may be stored in the memory 120 and/or the storage device 125. The learning database may include a plurality of learning images. The learning database may include labeling information for each of the learning images. The labeling information may include information about objects included in each of the learning images. For example, the labeling information may include information on an object included in the learning image and a bounding box indicating a position of the object.

The memory 120 and/or storage device 125 may store at least one instruction executed by the processor 110. The at least one instruction may be configured to generate a bounding box formation model using the learning images and labeling information contained in the learning database. Also, the at least one instruction may be configured to update the learning database by extracting learning images including a target object classified as a predetermined object in the learning database, and generating additional learning images in which the target object is rotated from the learning images including the target object.

The at least one instruction stored in the memory 120 and/or the storage device 125 may be updated by the machine learning of the processor 110. The machine learning performed by the processor 110 may be performed by a supervised learning method.

The processor 110 may read out the learning images and the labeling information stored in the learning database from the memory 120 and/or the storage device 125 in accordance with the at least one instruction stored in the memory 120 and/or the storage device 125. The processor 110 may then update the learning database by storing the additional learning images and the labeling information for the additional learning images in the memory 120 and/or the storage device 125. The processor 110 may generate a bounding box formation model by learning the learning database through machine learning. Deep learning techniques may be used in the machine learning process. The machine learning may be based on a supervised learning. However, embodiments of the present disclosure are not limited thereto. For example, the supervised learning may be based on reinforcement learning. Information about the bounding box formation model generated by the processor 110 may be stored in the memory 120 and/or the storage device 125.

Figure 2:
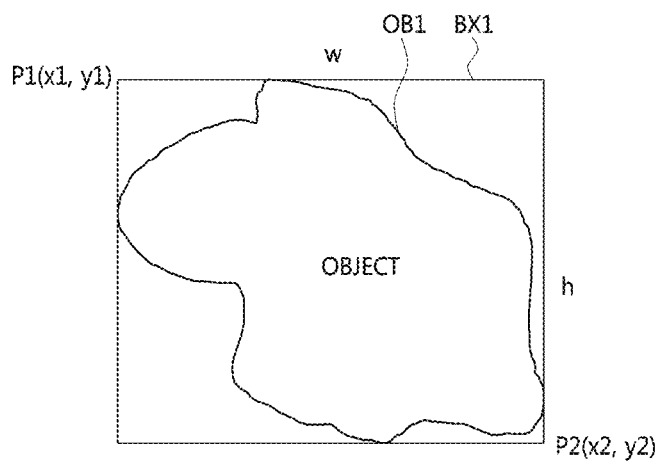
FIG. 2 is a conceptual diagram illustrating an example of a bounding box of an object in an image.

FIG. 2 is a conceptual diagram illustrating an example of a bounding box of an object in an image.

Referring to FIG. 2, a position of an object OB1 may be specified by a bounding box BX1. The bounding box BX1 may have a rectangular shape. The bounding box BX1 may be formed to include the object OB1 therein. The width w and the height h of the bounding box BX1 may have a minimum value within a range such that the bounding box BX1 includes the object OB1.

In image recognition using artificial intelligence, the processor 110 may form a bounding box as shown in FIG. 2 to estimate the position of object in the image. The processor 110 may determine two vertexes P1(x1, y1) and P2(x2, y2) in the bounding box BX1 diagonally facing each other to form the bounding box BX1. As another example, the processor 110 may determine the width w and the height h of the bounding box BX1 and one of the two vertexes P1(x1, y1) and P2(x2, y2).

The processor 110 may learn how to form the bounding box from the learning images stored in the learning database and labeling information for each of the learning images. The processor 110 may learn a method of forming a bounding box by a supervised learning by recognizing a learning image and confirming bounding box information of an object included in the learning image.

Figure 3:
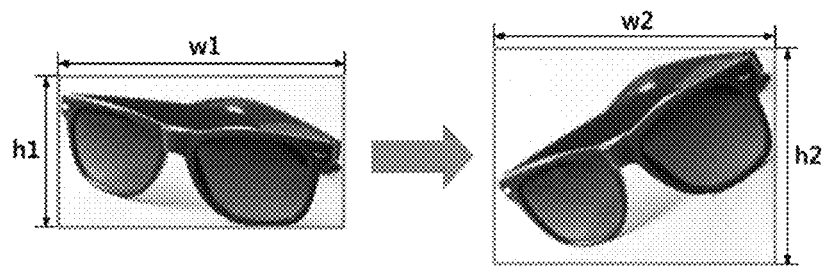
FIG. 3 is a conceptual diagram illustrating that a specification of a bounding box is changed by a rotation of an object included in the bounding box.

FIG. 3 is a conceptual diagram illustrating that a specification of a bounding box is changed by a rotation of an object included in the bounding box.

Referring to FIG. 3, the same eyeglasses may be photographed at different angles as shown in the left image and the right image. As a result, the sizes of the bounding boxes of the eyeglasses in the left image and the light image may be changed. As shown in FIG. 3, even with the same target object, the specification of the bounding box may vary depending on the arrangement angle of the target object in the image. For example, the bounding box of the eyeglasses has the width of w1 and the height of h1 in the left image, but the bounding box of the eyeglasses has the width of w2 and the height of h2 in the right image. The aspect ratio (w1/h1) of the eyeglasses in the left image may be different from the aspect ratio (w2/h2) of the eyeglasses in the right image.

In order to increase the accuracy of the bounding box formation model, the learning database is required to contain a large amount of learning data (i.e., learning images). Learning for forming a bounding box requires a large amount of learning images and information on bounding boxes of objects included in each of the learning images. Also, even for the same object, information about images in which the object is rotated and the bounding boxes configured accordingly should be included in the learning database.

However, it is not easy to secure a large number of rotated images for each object. Even if a plurality of rotated images of an object are secured, a bounding box for each rotated image should be individually configured by a person so that a bounding box for a newly acquired image can be generated. Such work requires considerable labor.

Figure 4:
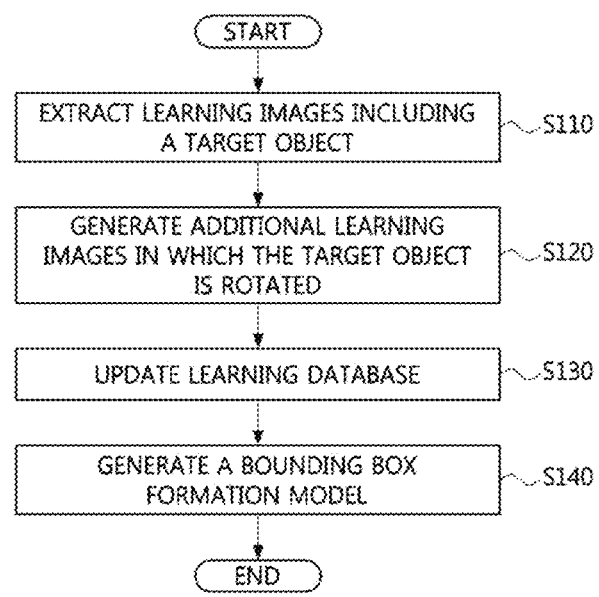
FIG. 4 is a flowchart for explaining a machine learning method of the machine learning apparatus for solving the above-mentioned problem.

FIG. 4 is a flowchart for explaining a machine learning method of the machine learning apparatus 100 for solving the above-mentioned problem.

Referring to FIG. 4, a machine learning method performed by the machine learning apparatus 100 may comprise a step S110 of extracting learning images including a target object among a plurality of learning images included in a learning database, a step S120 of generating additional learning images in which the target object is rotated from the learning images including the target object, and a step S130 of updating the learning database using the additional learning images.

In the step S110, the processor 110 may extract learning images including the target object among the learning images included in the learning database stored in the memory 120 and/or the storage device 125. Here, the target object may mean an object classified into a predetermined object. In the following description, a case where the target object is the eyeglasses is described as an example. For example, the processor 110 may extract learning images including a target object classified as eyeglasses among the learning images.

In the step S120, the processor 110 may generate at least one additional learning image in which the target object is rotated to supplement the learning database. The processor 110 may generate at least one additional learning image, and supplement the learning database using the at least one additional learning image prepared according to various rotation angles of the target object.

Figure 5:
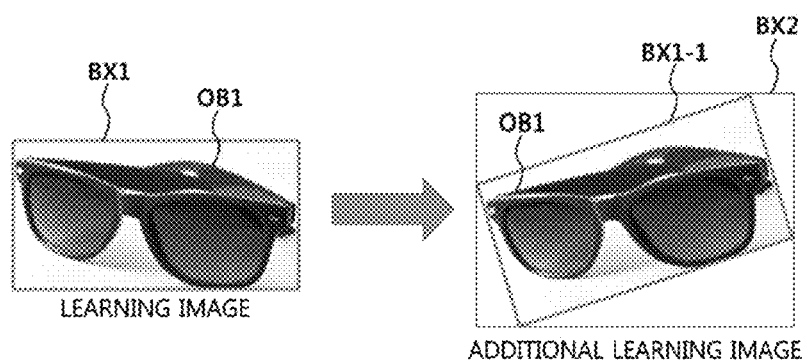
FIG. 5 is a conceptual diagram illustrating generation of an additional learning image and a new bounding box in the additional learning image.

FIG. 5 is a conceptual diagram illustrating generation of an additional learning image and a new bounding box in the additional learning image.

Referring to FIG. 5, the processor 110 may generate an additional learning image in which a target object OB1 is rotated in a learning image. The processor 110 may generate the additional learning image by rotating only a region of the bounding box BX1 including the object OB1 in the learning image. As another example, the processor 110 may generate the additional learning image by rotating the entire learning image.

The processor 110 may form a new bounding box BX2 of the object OB1 in the additional learning image. The processor 110 may form the new bounding box BX2 based on how the bounding box BX1 of the target object OB1 is rotated in the learning image. For example, the processor 110 may rotate the existing bounding box BX1 of the target object OB1 together with the target object OB1, and calculate coordinates of vertexes of the rotated bounding box BX1. The processor 110 may form the new bounding box BX2 such that it is the smallest rectangle containing all of the vertexes of the rotated bounding box BX1-1.

Referring again to FIG. 4, in the step S130, the processor 110 may label the new bounding box information formed in the additional learning image to the additional learning image generated in the step S120, and store them in the memory 120 and/or the storage device 125. The processor 110 may add the additional learning image and the labeling information of the additional learning image to the learning database. The labeling information of the additional learning image may include classification information of the target object included in the additional learning image and bounding box information indicating the position of the target object in the additional learning image. In the above description, the case where the target object is the eyeglasses has been described as an example, but the embodiment is not limited thereto. The processor 110 may repeat the process of generating the additional learning images and updating the learning database while changing the target object. The processor 110 may generate the additional learning images that include each of a variety of objects, and may form a new bounding box in each of the additional learning images. The processor 110 may then update the learning database using information about the additional learning images and the new bounding boxes.

In the step S140, the processor 110 may generate a bounding box formation model using the updated learning database. The processor 110 may learn the updated learning database based on machine learning, and generate the bounding box formation model based on the learning result. The processor 110 may form a bounding box when analyzing an image using the bounding box formation model generated in the step S140. As the amount of the learning database increases through the steps S120 and S130, the machine learning outcome can be improved. Accordingly, the accuracy of the bounding box formation model generated in the step S140 also can be increased.

Figure 6:
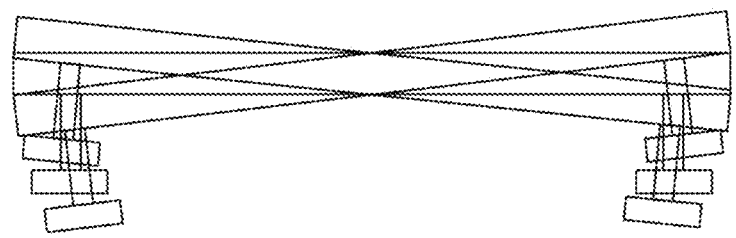
FIG. 6 is a conceptual diagram illustrating a change in arrangement angle of a balance beam in general photographed images.

FIG. 6 is a conceptual diagram illustrating a change in arrangement angle of a balance beam in general photographed images.

Referring to FIG. 6, in the general photographed images, a balance beam may be mostly photographed in the horizontal direction. That is, it is extremely rare that the balance beam is photographed in the vertical direction in the photographed image. Therefore, in case that the balance beam is set as the target object, if a uniform number of additional learning images are generated for each rotation angle, there may be a difference between the additional learning images and general photographed images. Also, if machine learning is performed using the additional learning images which are different from the general photographed images, the accuracy of the bounding box formation model may be lowered.

Figure 7:
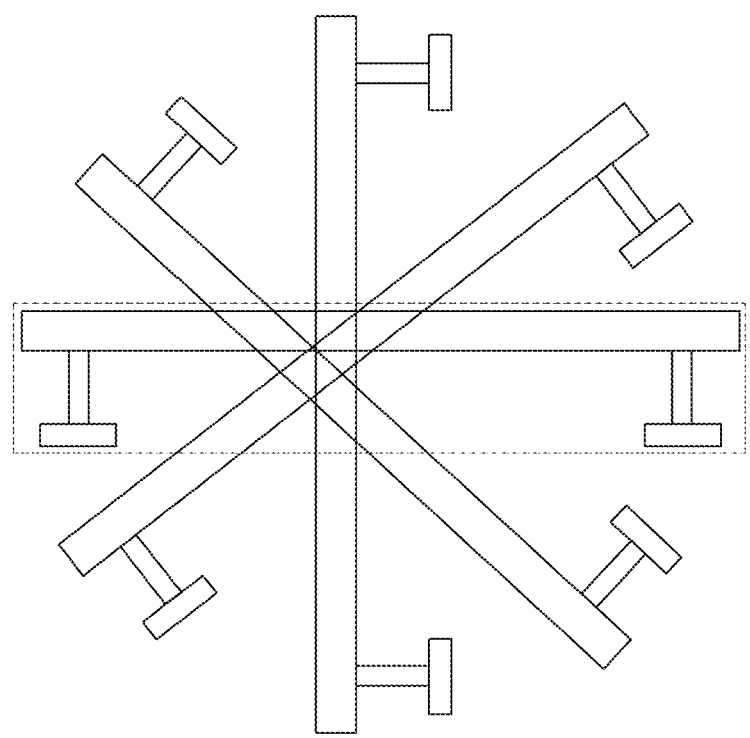
FIG. 7 is a conceptual diagram illustrating a problem that may occur when a uniform number of additional learning images are generated for each rotation angle.

FIG. 7 is a conceptual diagram illustrating a problem that may occur when a uniform number of additional learning images are generated for each rotation angle.

Referring to FIG. 7, when a uniform number of additional learning images are generated for each rotation angle, the same number of images generated for the balance beam arranged in the horizontal direction and for the balance beam arranged in the vertical direction may be added to the learning database. However, the probability of being photographed with a mean tilt of more than 45 degrees is extremely small. Thus, if a uniform number of additional learning images are generated for each rotation angle, the quality of the machine learning may deteriorate due to the inadequate additional learning images.

Figure 8:
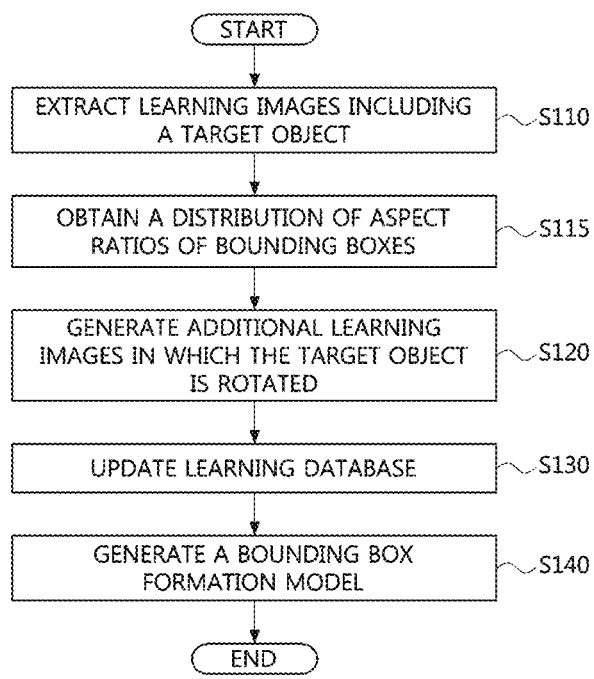
FIG. 8 is a flow chart for explaining a machine learning method of the machine learning apparatus according to an embodiment of the present disclosure.

FIG. 8 is a flow chart for explaining a machine learning method of the machine learning apparatus 100 according to an embodiment of the present disclosure. In the following description of the embodiment of FIG. 8, the description redundant with that of FIG. 4 is omitted.

Referring to FIG. 8, the machine learning method of the machine learning apparatus 100 may further include a step S115 of obtaining information on a distribution of aspect ratios of bounding boxes of a target object in learning images including the target object.

In the step S115, the processor 110 may obtain information on bounding boxes of the target object in each of the learning images including the target object extracted in the step S110, and calculate the aspect ratios of the bounding boxes included in the learning images. The processor 110 may obtain the information on the distribution of the aspect ratios from the calculated aspect ratios of the bounding box in each of the learning images.

Figure 9:
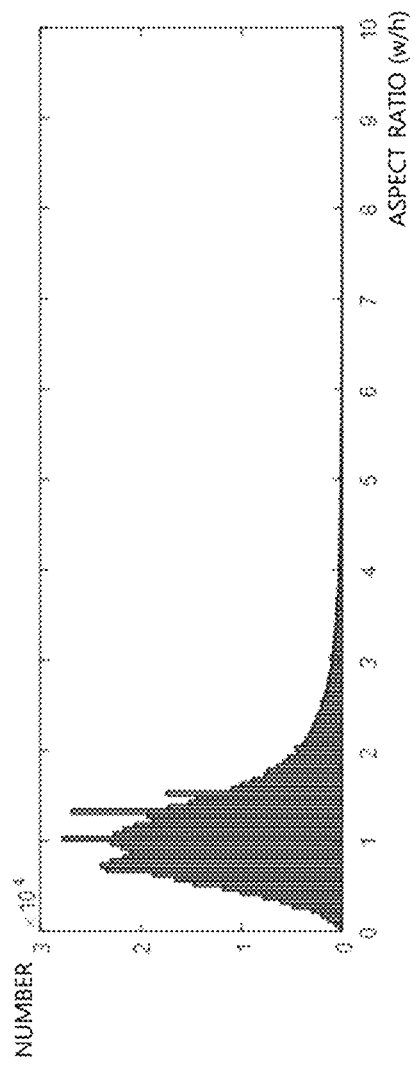
FIG. 9 is a graph illustrating a distribution of aspect ratios of bounding boxes of a general object.

FIG. 9 is a graph illustrating a distribution of aspect ratios of bounding boxes of a general object.

Referring to FIG. 9, an aspect ratio of a bounding box of a general object may have a value between approximately 0.5 and 2. However, in the case of a horizontal object such as the balance beam shown in FIG. 7, the aspect ratio of the bounding box may be higher. Therefore, in order to generate the additional learning images for the balance beam, images including the balance beam are required to be extracted, and the distribution of aspect ratios of the bounding boxes of the balance beam is required to be grasped first.

Figure 10:
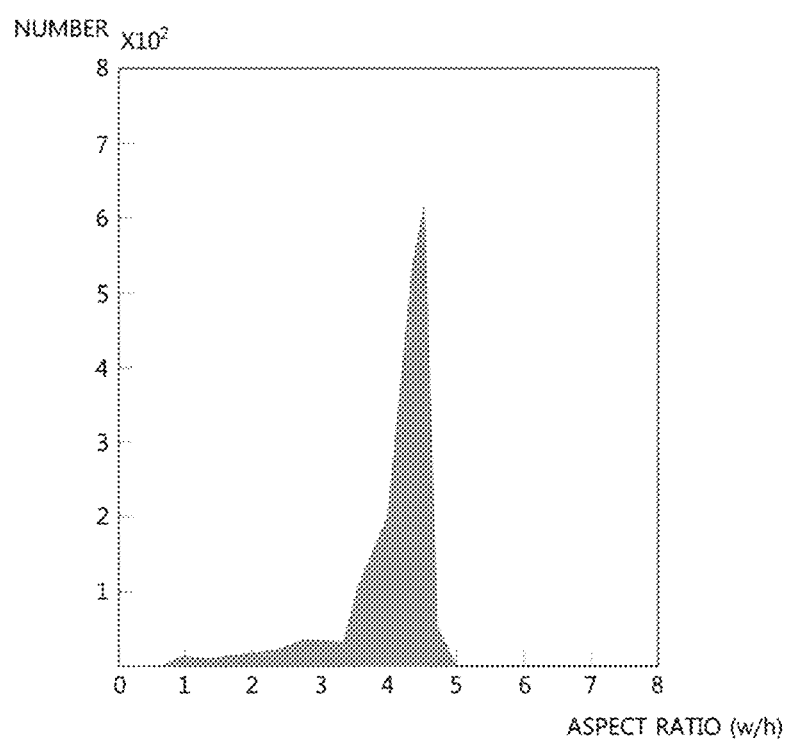
FIG. 10 is a graph illustrating a distribution of aspect ratios of bounding boxes of a balance beam in learning images including the balance beam.

FIG. 10 is a graph illustrating a distribution of aspect ratios of bounding boxes of a balance beam in learning images including the balance beam.

The distribution shown in FIG. 10 is merely an example, and the specific distribution shape may be slightly different depending on how the learning images are collected. Referring to FIG. 10, the aspect ratios of bounding boxes in the learning images including the balance beam may be distributed widely in the range of 3 to 5 in most cases. Also, since the maximum aspect ratio of the balance beam is 5, there may be no bounding box having an aspect ratio of 5 or more. The processor 110 may utilize the distribution information shown in FIG. 10 to determine the rotation angle of the balance beam contained in each of the additional learning images. That is, when generating the additional learning images, the processor 110 may change the rotation angle in consideration of the aspect ratio distribution of the bounding boxes, which is determined from the existing learning images, instead of uniformly changing the rotation angle.

The processor 110 may generate the additional learning images such that the distribution of the aspect ratios of the bounding boxes included in the additional learning images follows the distribution shown in FIG. 10. For example, the processor 110 may generate relatively more additional learning images rotated at an angle between approximately 0 and 10 degrees in the horizontal direction, and may generate relatively few additional learning images rotated at different angles.

The machine learning method performed by the machine learning apparatus 100 has been described above. According to the above-described embodiments, the machine learning apparatus 100 may automatically update the learning database so that the machine learning result can be more accurate. Also, when updating the learning database, the aspect ratio distribution of the bounding boxes included in the additional learning images may be made to follow the aspect ratio distribution of the bounding boxes included in the existing learning images. As a result, the machine learning effect through the updated learning database can be improved.

The machine learning apparatus 100 may generate the bounding box formation model using the learning database. The machine learning apparatus 100 may learn the learning database by machine learning. The machine learning apparatus 100 may learn the learning database in a different manner in accordance with learning parameters related to the machine learning. When learning the learning images, the machine learning apparatus 100 may set learning conditions with the same learning parameters. As another example, the machine learning apparatus 100 may set the learning parameters differently according to the image type of the object included in the learning image.

Figure 11:
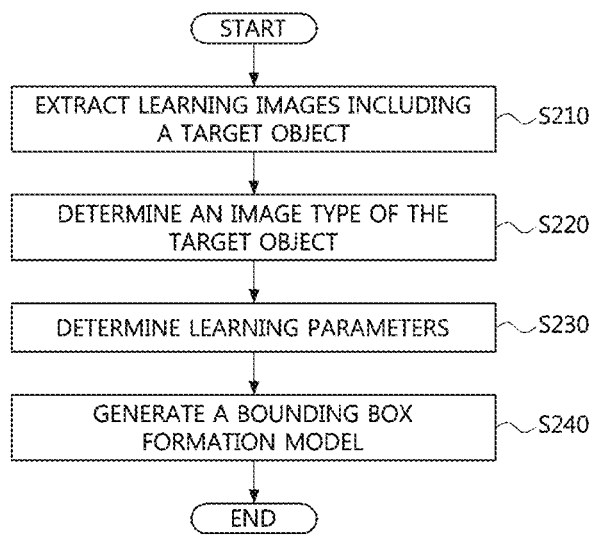
FIG. 11 is a flowchart for explaining a machine learning method of the machine learning apparatus according to another embodiment of the present disclosure.

FIG. 11 is a flowchart for explaining a machine learning method of the machine learning apparatus 100 according to another embodiment of the present disclosure.

Referring to FIG. 11, in a step S210, the processor 110 may extract learning images including a target object among learning images included in a learning database.

In a step S220, the processor 110 may determine the image type of the target object. The image type may be determined according to a specification of a bounding box of the target object. For example, depending on the size of the bounding box of the target object, the image type of the target object may be determined to be either large, small, or medium. As another example, depending on the aspect ratio of the bounding box of the target object, the image type of the target object may be determined as either a horizontal type, a vertical type, or a normal type.

The processor 110 may obtain information on specifications of the bounding boxes of the target object in the learning images including the target object, in order to determine the image type of the target object. The information on the specifications of the bounding boxes may include information about the sizes of the bounding boxes. As another example, the information on the specifications of the bounding boxes may include information about the aspect ratios of the bounding boxes.

The processor 110 may determine the image type of the target object using the information about the sizes of the bounding boxes. For example, the target object may be classified into one of a large size, a small size, and a medium size by comparing an average value of the width values of the bounding boxes with predetermined reference values.

The processor 110 may determine the image type of the target object using the information about the aspect ratios of the bounding boxes. The processor 110 may determine the image type of the target object based on Equations 1 and 2 below.

$$\text{Aspect\_ratio\_mean} > Th1 \quad \text{[Equation 1]}$$

$$\text{Aspect\_ratio\_max} / \text{Aspect\_ratio\_min} > Th2 \quad \text{[Equation 2]}$$

In Equations 1 and 2, Aspect_ratio_mean may denote the average value of the aspect ratios of the bounding boxes of the target object, Aspect_ratio_max may denote the maximum value among the aspect ratios of the bounding boxes of the target object, and Aspect_ratio_min may denote the minimum value among the aspect ratios of the bounding boxes of the target object. Also, Th1 may denote a first reference value, and Th2 may denote a second reference value. The first reference value Th1 and the second reference value Th2 may be preset by a developer or a user.

The processor 110 may determine the target object to be the horizontal type if both of Equations 1 and 2 are satisfied. That is, the processor 110 may recognize characteristics of each object in the learning database based on Equations 1 and 2, and classify each object into one of the normal type, the horizontal type, and the vertical type.

Figure 12:
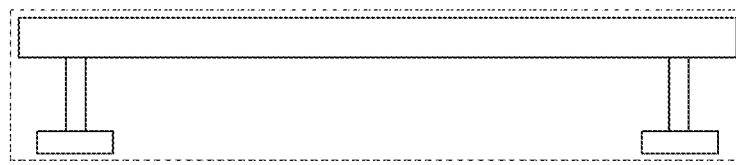
FIG. 12 is a conceptual diagram illustrating an object whose image type is determined as a horizontal type.

FIG. 12 is a conceptual diagram illustrating an object whose image type is determined as a horizontal type.

Referring to FIG. 12, in case of the balance beam, the average value Aspect_ratio_mean of the aspect ratios of the bounding boxes of the balance beam in the learning images including the balance beam may be larger than the predetermined first reference value Th1. Also, the ratio of Aspect_ratio_max and Aspect_ratio_min may be larger than the second reference value Th2. Accordingly, the processor 110 may determine the image type of the balance beam as the horizontal type.

Figure 13:
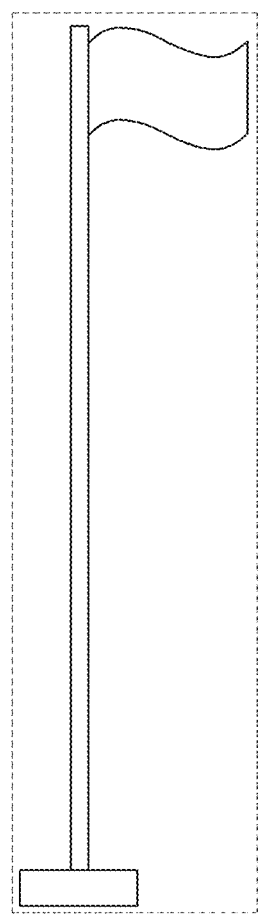
FIG. 13 is a conceptual diagram illustrating an object whose image type is determined as a vertical type.

FIG. 13 is a conceptual diagram illustrating an object whose image type is determined as a vertical type.

Referring to FIG. 13, in case of a flagpole, the average value Aspect_ratio_mean of the aspect ratios of the bounding boxes of the flagpole in the learning images including the flagpole may be less than the predetermined first reference value Th1. Also, the ratio of Aspect_ratio_max and Aspect_ratio_min may be less than the second reference value Th2. Accordingly, the processor 110 may determine the image type of the flagpole as the vertical type.

Figure 14:
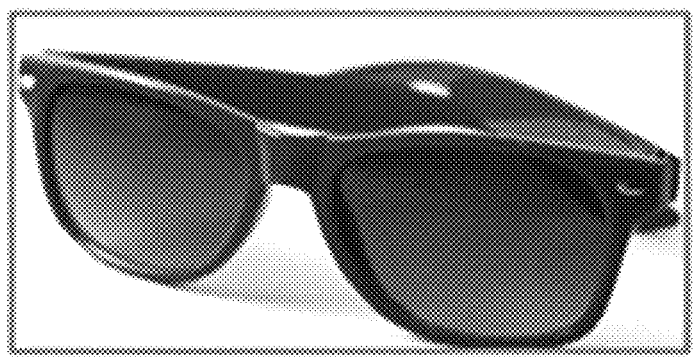
FIG. 14 is a conceptual diagram illustrating an object whose image type is determined as a normal type.

FIG. 14 is a conceptual diagram illustrating an object whose image type is determined as a normal type.

Referring to FIG. 14, in case of eyeglasses, the average value Aspect_ratio_mean of the aspect ratios of the bounding boxes of the eyeglasses in the learning images including the eyeglasses may be larger than the predetermined first reference value Th1. Also, the ratio of Aspect_ratio_max and Aspect_ratio_min may be less than the second reference value Th2. That is, the learning images including the eyeglasses may satisfy Equation 1 but not Equation 2. Accordingly, the processor 110 may determine the image type of the eyeglasses as the normal type.

Referring again to FIG. 11, in a step S230, the processor 110 may determine learning parameters for the learning images including the target object, based on the image type of the target object. For example, the processor 110 may classify the balance beam into the horizontal type, and when learning the learning images including the balance beam, the learning environment may be set with the learning parameters for the horizontal type image learning. As another example, the processor 110 may classify the flagpole into the vertical type, and when learning the learning images including the flagpole, the learning environment may be set with the learning parameters for the vertical type image learning. That is, the processor 110 may set different learning parameters for determining the learning environment when learning the learning image, according to the image type of the target object included in the learning images.

In a step S240, the processor 110 may generate a bounding box formation model. The processor 110 may generate the bounding box formation model by learning the learning database. The processor 110 may learn the learning images and generate the bounding box formation model using the labeling information for the learning images as feedback information. The labeling information may include the identification information of the object included in the learning images and the bounding box information of the object.

The processor 110 may learn the learning images in a learning manner determined by the learning parameters assigned to each of the learning images, when learning the learning images. For example, when the processor 110 learns a learning image including a horizontal object such as the balance beam, the processor 110 may set the learning environment with the learning parameters for the horizontal image learning. When learning a learning image including a vertical object such as the flagpole, the processor 110 may set the learning environment with the learning parameters for the vertical image learning. When learning a learning image including a normal type object such as the eyeglasses, the processor 110 may set the learning environment with the learning parameters for the normal type image learning. The accuracy of the bounding box formation model may be enhanced by the processor 110 applying the learning parameters differently according to the image type of the object included in the learning image.

The machine learning method of the machine learning apparatus 100 and the machine learning apparatus 100 according to the exemplary embodiments have been described above with reference to FIG. 1 to FIG. 14. According to the embodiments, the quality of the machine learning can be improved by adding additional learning images in which a target object is rotated and information on bounding boxes of the target object in the additional learning images to a learning database. Further, by setting learning parameters for each of learning images containing the target object differently according to the image type of the target object, accuracy of a bounding box formation model generated by the machine learning can be enhanced.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A machine learning method for learning how to form bounding boxes, performed by a machine learning apparatus, the machine learning method comprising:
   extracting learning images including a target object among a plurality of learning images included in a learning database;
   obtaining information on a distribution of aspect ratios of bounding boxes of the target object in the learning images including the target object;
   generating additional learning images in which the target object is rotated from the learning images including the target object; and
   updating the learning database using the additional learning images.

2. The machine learning method according to claim 1, wherein, in the generating additional learning images, a rotation angle of the target object included in each of the additional learning images is determined based on the distribution of aspect ratios of bounding boxes of the target object.

3. The machine learning method according to claim 2, wherein, in the generating additional learning images, the additional learning images are generated so that a distribution of aspect ratios of bounding boxes of the target object included in the additional learning images follows the distribution of aspect ratios of bounding boxes of the target object in the learning images including the target object.

4. The machine learning method according to claim 1, wherein, in the updating, a bounding box of the target object included in each of the additional learning images is reformed, and information on the reformed bounding box are added to the learning database as being labeled to each of the additional learning images.

5. The machine learning method according to claim 1, further comprising generating a bounding box formation model using the updated learning database.

6. A machine learning method for learning how to form bounding boxes, performed by a machine learning apparatus, the machine learning method comprising:
   extracting learning images including a target object among a plurality of learning images included in a learning database;
   determining an image type of the target object;
   determining learning parameters for the learning images including the target object based on the image type of the target object; and
   generating a bounding box formation model based on the learning database and the learning parameters,
   wherein, in the determining an image type of the target object, information on specifications of bounding boxes of the target object in the learning images including the target object is obtained, and the image type of the target object is determined based on the information on specifications of bounding boxes.

7. The machine learning method according to claim 6, wherein, in the determining an image type of the target object, the image type of the target object is determined as one of a horizontal type, a vertical type, and a normal type based on aspect ratios of the bounding boxes of the target object.

8. The machine learning method according to claim 7,
   wherein the image type of the target object is determined as the horizontal type when both of Equations 1 and 2 are satisfied, determined as the vertical type when both of Equations 1 and 2 are not satisfied, or determined as the normal type when only one of Equations 1 and 2 is satisfied, and
   wherein Equation 1 is 'Aspect_ratio_mean>Th1', Equation 2 is 'Aspect_ratio_max/Aspect_ratio_min>Th2', Aspect_ratio_mean denotes an average value of aspect ratios of the bounding boxes of the target object, Aspect_ratio_max denotes a maximum value among the aspect ratios of the bounding boxes of the target object, Aspect_ratio_min denotes a minimum value among the aspect ratios of the bounding boxes of the target object, Th1 denotes a first reference value, and Th2 denotes a second reference value.

9. A machine learning apparatus for learning how to form bounding boxes, comprising a processor and a memory storing at least one instruction executed by the processor, wherein the at least one instruction is configured to:
   extract learning images including a target object among a plurality of learning images included in a learning database;
   obtain information on a distribution of aspect ratios of bounding boxes of the target object in the learning images including the target object;
   generate additional learning images in which the target object is rotated from the learning images including the target object; and
   update the learning database using the additional learning images.

10. The machine learning apparatus according to claim 9, wherein the at least one instruction is further configured to determine a rotation angle of the target object included in each of the additional learning images based on the distribution of aspect ratios of bounding boxes of the target object.

11. The machine learning apparatus according to claim 10, wherein the at least one instruction is further configured to generate the additional learning images so that a distribution of aspect ratios of bounding boxes of the target object included in the additional learning images follows the distribution of aspect ratios of bounding boxes of the target object in the learning images including the target object.

12. The machine learning apparatus according to claim 9, wherein the at least one instruction is further configured to reform a bounding box of the target object included in each of the additional learning images, and add information on the reformed bounding box to the learning database as being labeled to each of the additional learning images.

13. The machine learning apparatus according to claim 9, wherein the at least one instruction is further configured to generate a bounding box formation model using the updated learning database.

14. The machine learning apparatus according to claim 9, wherein the at least one instruction is further configured to determine an image type of the target object, determine learning parameters for the learning images including the target object based on the image type of the target object, and generate a bounding box formation model based on the learning database and the learning parameters.

15. The machine learning apparatus according to claim 14, wherein the at least one instruction is further configured to obtain information on specifications of bounding boxes of the target object in the learning images including the target object, and determine the image type of the target object based on the information on specifications of bounding boxes.

16. The machine learning apparatus according to claim 15, wherein the at least one instruction is further configured to determine the image type of the target object as one of a horizontal type, a vertical type, and a normal type based on aspect ratios of the bounding boxes of the target object.

17. The machine learning apparatus according to claim 16,
- wherein the at least one instruction is further configured to determine the image type of the target object as the horizontal type when both of Equations 1 and 2 are satisfied, determine the image type of the target object as the vertical type when both of Equations 1 and 2 are not satisfied, or determine the image type of the target object as the normal type when only one of Equations 1 and 2 is satisfied, and
- wherein Equation 1 is 'Aspect_ratio_mean>Th1', Equation 2 is 'Aspect_ratio_max/Aspect_ratio_min>Th2', Aspect_ratio_mean denotes an average value of aspect ratios of the bounding boxes of the target object, Aspect_ratio_max denotes a maximum value among the aspect ratios of the bounding boxes of the target object, Aspect_ratio_min denotes a minimum value among the aspect ratios of the bounding boxes of the target object, Th1 denotes a first reference value, and Th2 denotes a second reference value.

* * * * *